United States Patent [19]

Sargent et al.

[11] Patent Number: 5,560,992
[45] Date of Patent: Oct. 1, 1996

[54] SOIL RESISTANT FIBERS

[75] Inventors: R. Richard Sargent, Rome; Jeffrey R. Alender, Marietta, both of Ga.

[73] Assignee: Peach State Labs, Inc., Rome, Ga.

[21] Appl. No.: 472,858

[22] Filed: Jun. 7, 1995

Related U.S. Application Data

[60] Division of Ser. No. 85,419, Jun. 30, 1993, Pat. No. 5,459,188, which is a continuation-in-part of Ser. No. 683,915, Apr. 11, 1991, abandoned.

[51] Int. Cl.$^6$ .............................. D01F 8/06; D01F 8/12; D01F 8/14
[52] U.S. Cl. .................... 428/373; 428/357; 428/394; 428/395; 264/172.15
[58] Field of Search ..................... 428/373; 264/172.15

[56] References Cited

U.S. PATENT DOCUMENTS

| | | |
|---|---|---|
| 3,005,795 | 10/1961 | Busso et al. . |
| 3,126,368 | 3/1964 | Lemmerich . |
| 3,148,234 | 9/1964 | Boyer . |
| 3,258,425 | 6/1966 | Burke . |
| 3,294,871 | 12/1966 | Schmitt et al. . |
| 3,679,641 | 7/1972 | Davis et al. . |
| 4,046,944 | 9/1977 | Mueller et al. . |
| 4,251,200 | 2/1981 | Parkin . |
| 4,400,414 | 8/1983 | DeMott . |
| 4,518,649 | 6/1985 | Wang et al. . |
| 4,695,488 | 9/1987 | Hisamoto et al. . |
| 4,787,989 | 11/1988 | Fanelli et al. . |
| 4,818,587 | 4/1989 | Ejima et al. . |
| 4,863,819 | 9/1989 | Borcher, Sr.; et al. . |
| 4,904,735 | 2/1990 | Chapman et al. . |
| 5,132,368 | 7/1992 | Chapman et al. . |

FOREIGN PATENT DOCUMENTS

| | | |
|---|---|---|
| 45-30574 | 10/1970 | Japan . |
| 54-028358 | 3/1979 | Japan . |
| 58-136639 | 8/1983 | Japan . |
| 58-187441 | 11/1983 | Japan . |
| 58-196247 | 11/1983 | Japan . |

OTHER PUBLICATIONS

Cooks T. F., "Soil Release Finishes for Fibers and Fabrics," *Textile Chemist and Colorist* Jan. 1987, vol. 19, No. 1, pp. 31–41.

Deasaint, A., et al., "Fluorinated Products for the Stain Repellant Finishing of Substrates," *Chemical Abstracts*, Aug. 8, 1977, vol. 87, No. 6, 87:40697k.

Hager, H., "(Perfluoroalkyl)alkanoates for Oil Repellant Finishes for Textiles," *Chemical Abstracts, Jan. 10, 1973, vol. 76, No. 2,* 4871h and 4872o.

Allied. Corp., "Soil Resistant Yarn Finish for Synthetic Organic Polymar Yarn," *World Textile Abstracts*, Sep. 15, 1984 vol. 16, No. 17, Abstract 5727.

Chicopes, R., et al., "Soil Releasing Textile Containing Fluorochemical Soil–Releas Agents and Method for Producting Same," *World Textile Abstracts*, Sep. 30, 1986, vol. 18, No. 18, Abstract 5418.

Chiyoda, A., "Soil–Releasing Fiber Goods," *Chemical Abstracts*, Apr. 21, 1975, vol. 82, No. 16, 100014u.

Hebeish, A., "Chemical Factors Affecting Soiling and Soil Releases from Cotton–Containing Durable–Process Fabrics . . . ," *World Textile Abstracts*, Jan. 31, 1986, vol. 17, No. 2, Abstract 482.

Kizza, E., "Soil Release—Past, Present and Future," *World Textile Abstracts*, Oct. 16,1984, vol. 16. No. 19, Abstract 6330.

Lotta, B., et al., "Oily–Soil Release for Easy Care Cotton Fabric," *Chemical Abstracts*, Oct. 19, 1961, vol. 95, No. 16, 95:134214t.

Maros, et al., "A Single–Treatment Process for imparting Durable Soil–Release Properties to Cotton and Cotton–Polyester Blend Fabrics of Several Constructions and Compositions," Dist. by NTIS, U.S. Dept. of Commerce, PB251 448.

Matsuo, H., et al. "Soil–Releasing Water and Oil Repellents," *Chemical Abstracts*, Nov. 28, 1988, vol. 109, No. 22 Abstract 109:192101.

Mizino, T., et al. "Water Proofing and Oil Proofing of Fibers," *Chemical Abstracts*, Aug. 23, 1976, vol. 85, No. 8, 85:48218o.

Obmari, A., et al., "Water –and Oil–Repellant Antifouling Finishing Agent," *World Textile Abstracts*, Nov. 30, 1989, vol. 21, No. 22, Abstract 7139.

Raynolds, S., et al., "Fluoropolymer Compositon. Their Preparation and Use," *World Textile Abstracts*, Oct. 31, 1987, vol. 19, No. 22, Abstract 6178.

Rowland, et al., "Method of Fixing Water–Soluble Vinyl Monomers in and On Fibrous Substrates," Dist. by NTIS U.S. Dept. of Commerce, PB–242 692 U.S.S.N. 801,412, filed Aug. 28, 1974.

Schmover, R. W., "Florinated Oily Soil Release Agents," *Chemical Abstracts*, Aug. 23, 1976, vol. 85, No. 8, 85:48219k.

Shin–Eatu Chemical Industry, "Compositions for Treatment of Fabrics," *Chemical Abstracts*, Jun. 03, 1985, vol. 102, No. 22, 102:1866311.

Togo, M., et al., "Antistain Treatment of Synthetic Fibers," *Chemical Abstracts*, Dec. 11, 1972, vol. 77, No. 24, 153836s.

Toyoto Co. Ltd., "Synthetic Fibers with Water–,Oil–, and Soil–Repellence," *Chemical Abstracts*, May 20, 1985, vol. 102, No. 20, 102 168269t; 102:168270m.

Toyota Co. Ltd., "Soil Resistant Synthetic Fibers" *Chemical Abstracts*, May 20, 1985, vol. 102, No. 20, 102:168285v.

Ukihaaki, H., et al., "Oil and Water Repellents with Soil Release Properties," *Chemical Abstracts*, Oct. 06, 1975, vol. 83, No. 14, 116838x.

Viokurous, L., et al., "Organofluorine Compounds for Oil/ Water Repellant and Acid–Resistant Finishing," *World Textile Abstracts*, Oct. 15, 1985, vol. 17, No. 19, Abstract 6293.

Wang. R., et al., "Textiles Containing Fluorochemical Soil Release Agents," *Chemical Abstracts*, Aug. 12, 1985, vol. 103, No. 6, 103:38874t.

*Primary Examiner*—Carman J. Seccuro, Jr.
*Attorney, Agent, or Firm*—Kilpatrick & Cody; Cheryl K. Zalesky

[57] ABSTRACT

Permanently soil resistant polymeric compositions that have fluorochemical dispersed throughout the polymer are prepared by melt extrusion of the fluorochemical with the desired polymer. Preferred polymers for extrusion with the fluorochemical are polyester, polypropylene, polyethylene, and polyamide.

15 Claims, No Drawings

SOIL RESISTANT FIBERS

This application is a divisional of U.S. Ser. No. 08/085,419, filed on Jun. 30, 1993, now U.S. Pat. No. 5,459,188, which is a continuation-in-part of U.S. Ser. No. 07/683,915, filed on Apr. 11, 1991, now abandoned, entitled "Soil Resistant Fibers" by R. Richard Sargent.

This invention is in the area of fiber technology, and in particular relates to carpet and textile fibrous compositions prepared by melt extrusion of a polymer with a fluorochemical. Also described are polymeric articles, including thin film and molded objects prepared from polymeric compositions that have a fluorochemical dispersed throughout a polymer.

BACKGROUND OF THE INVENTION

Carpet and textile fibers are easily soiled and stained in everyday use. The problem of fiber soiling has become more difficult with the advent of synthetic fibers such as polypropylene, polyamide, polyethylene, and polyester, that are substantially more oleophilic (oil-loving) than traditional natural fibers such as cotton and wool.

A wide variety of materials are known to cause soiling. Soil found on fibers can include a variety of solid particles, such as fly ash or other inorganic particulates; liquids, such as oils and greases; mixtures of solids and liquids, such as soot (that contain particles mixed with oily components); and biological matter such as skin cells and sebum.

Soil typically adheres to the fiber surface by Van der Waals forces, that are effective only over very short distances. The strength of the bond depends on the forces of interaction per unit interfacial area, the area of contact, and whether a liquid is present on the fiber surface. Oily films on the fiber increase soiling. In general, the higher the viscosity of the liquid, the greater the adhesion of the liquid to the fiber. Soil particles can even adhere to initially smooth surfaces, such as polyester and polyethylene film. Soil is not commonly mechanically entrapped in the fiber.

Staining of a fiber can occur in a wide variety of ways, including through the ionic or covalent binding of an exogenous colored substance to the fiber. For example, nylon fibers are polyamides with terminal amino and carboxyl end groups. Nylon is commonly stained by acid dyes, which are colored, negatively charged molecules that ionically bind to the protonated terminal amine. Examples of staining acid dyes include liquids containing FD&C Red Dye No. 4, wine, and mustard.

For many years, soil (as opposed to stain) resistance has been imparted to carpet and textile fibers by applying a finish that repels oil and water. Perhaps the first soil resist agent for fibers was starch, that was removed along with the soil when the fiber was washed. Other water soluble polymeric stain resist finishes have included methylcellulose, hydroxypropyl starch, polyvinyl alcohol, alginic acid, hydroxyethyl cellulose and sodium carboxymethyl cellulose. As with starch, the strong disadvantage of these protective finishes is that their mechanism of action is sacrificial; they contain the soil but are removed along with it when the fiber is cleaned.

Vinyl polymers including acrylics, methacrylics and polymers of maleic acid have also been used as soil release agents. One of the first patents in this area was U.S. Pat. No. 3,377,249, issued in 1969 and assigned to Deering Milliken, disclosing and claiming emulsions of copolymers of ethyl acrylate with at least 20% acrylic, methacrylic, or itaconic acid in combination with N-methylol acrylamide.

More recently, fluorochemical soil release agents have become very popular. The fluorochemical agents are coated onto the fiber to prevent wetting of the surface by minimizing chemical contact between the surface and substances that can soil the carpet, making the substance easier to remove.

The first fluorochemical finishes focused on reducing the surface energy of the fiber to prevent the spreading of oily soils. More recently developed fluorochemical finishes have attempted to combine reduction in surface energy with hydrophilicity, as described in U.S. Pat. No. 3,728,151. Increased hydrophilicity facilitates the removal of the soil or staining material during washing. Hydrophilic moieties in soil resist finishes that include a number of hydrogen bonding groups, including polyalkylene glycols.

A number of patents describe fluorinated polymers for use as soil resist coatings for fibers, including U.S. Pat. No. 3,759,874 (describing polyurethanes that consist of a combination of an oleophilic fluorine-containing block and a hydrophilic polyethyleneoxide block) and U.S. Pat. No. 4,046,944 (describing a fluorinated condensation block copolymer, that include oleophilic fluorinated blocks and hydrophilic polyethyleneoxide blocks connected by urea linkages).

Fluorochemical coatings have been used extensively on carpet fibers, either alone (Antron Plus™ carpet manufactured by E. I. DuPont Nemours and Company), or in combination with an acid dye stain resistant polymeric formulation that includes a sulfonated aromatic formaldehyde condensation polymer. Examples of commercially available fluorochemical coatings for carpet fibers include Scotchgard™ 358 and 352 (Minnesota Mining & Mfg. Co.), Zonyl™ 5180 Fluorochemical dispersion, and Teflon Tuft Coat Anionic (E. I. Du Pont de Nemours and Company, Inc.). Zonyl™ 5180 is an aqueous fluorochemical dispersion containing a 1–10% polyfunctional perfluoroalkyl ester mixture, 10–20% polymethylmethacrylate, and 70–75% water. Teflon Toughcoat Anionic contains 5–10% perfluoroalkyl substituted urethanes, 1–5% polyfunctional perfluoroalkyl esters, and 85–90% water.

Although fluorinated finishing coats on fibers do impart an amount of soil resistance to the fiber, they all suffer from the distinct disadvantage that they are removed by routine maintenance of the fiber. None of the fluorochemical finishes available to date provides permanent protection from soiling and staining. This is a particular problem for polypropylene, that is very oleophilic, and that has begun to compete with nylon as a fiber for use in residential carpets.

Therefore, it is an object of the present invention to provide carpet and textile fiber that has permanent soil resistance.

It is another object of the present invention to provide a method of manufacture of permanently soil resistant fibers.

It is a further object of the present invention to provide a polypropylene fiber that has superior soil resistance.

SUMMARY OF THE INVENTION

Permanently soil resistant polymeric compositions are prepared by extruding an appropriate polymer, copolymer, or polymer mixture, in combination with a fluorochemical, to produce a fiber that has the fluorochemical dispersed throughout the filament. Fibers produced in this manner have a decreased surface energy and thus decreased tendency to adhere to soiling agents. The fluorochemical is intricately bound with the polymer, imparting to it permanent soil resisting properties.

Any polymer, copolymer, or polymer mixture that can be extruded with the desired fluorochemical can be used to prepare the soil resistant fiber. Preferred polymers for melt extrusion are polypropylene, nylon 6, polyester, and polyethylene, or mixtures of these. A preferred fluorochemical is Zonyl FTS Fluorotelomer 5822APP marketed by E. I. Du Pont Nemours and Company.

In one embodiment, in a first step of manufacture, the polymer chip and fluorochemical are blended in a rotary drum dry blender. The blended chips are then poured into a feed hopper, and extruded through a heated temperature chamber and spinneret to form monofilament that is chipped or flaked to an appropriate size. The chips or flakes are then shaped as desired, or extruded into fiber. In an optional second step, the polymer fluorochemical chips are blended with other polymer chips that do not contain fluorochemical, and the blend is then extruded to form objects or fibers of a desired size. The polymer in the chip or flake can be the same as or different than the polymer that is later mixed with the chip or flake.

The polymer/fluorochemical chips can also be used to coat a polymer fiber to improve its properties. For example, nylon 6 (such as polycaprolactam) can be coated with a polyester or polypropylene that has a fluorochemical dispersed in it to impart soil resisting properties to the nylon.

Thin films of polymer with fluorochemical dispersed in the film can also be prepared that have superior antiwetting properties. These films can be coated with an adhesive shortly after preparation without the need to extensively dry the film.

Polypropylene fibers prepared as described herein can be used in residential or commercial carpet to provide a long lasting, durable carpet with permanent soil resistance and low flammability.

DETAILED DESCRIPTION OF THE INVENTION

The term alkyl, as used herein, refers to a saturated straight, branched, or cyclic (or a combination thereof) hydrocarbon of $C_1$ to $C_{20}$, and specifically includes methyl, ethyl, propyl, isopropyl, cyclopropylmethyl, cyclobutylmethyl, butyl, isobutyl, t-butyl, pentyl, cyclopentyl, isopentyl, neopentyl, hexyl, isohexyl, cyclohexyl, 3-methylpentyl, 2,2-dimethylbutyl, 2,3-dimethylbutyl, heptyl, octyl, nonyl, and decyl.

The term aryl, as used herein, refers to phenyl, or substituted phenyl, wherein the substituent is halo, alkyl, alkoxy, alkylthio, haloalkyl, hydroxyalkyl, alkoxyalkyl, methylenedioxy, cyano, C(O)(alkyl), carboxylic acid, $CO_2$alkyl, amide, amino, alkylamino or dialkylamino, and wherein the aryl group can have up to 3 substituents.

The term aralkyl refers to an aryl group with an alkyl substituent.

The term alkaryl refers to an alkyl group that has an aryl substituent, including benzyl, substituted benzyl, phenethyl or substituted phenethyl, wherein the substituents are as defined above for aryl groups.

As used herein the term alkanoic or alkenoic acid refers to a $C_4$ to $C_{22}$ alkyl or alkenyl carboxylic acid, including, but not limited to lauric, oleic, caproic, linoleic, linolenic, caprylic, capric, perlargonic, neononanoic, neodecanoic, palmitelaidoic, myristic, palmitic, stearic, arachidic, behenic, lignoceric, heptanoic, nonanoic, undecanoic, tridecanoic, pentadecanoic, heptadecanoic, nonadecanoic, heneicosanoic, tricosanoic, arachidonic, docosahexanoic, elaidic, erucic, nervonic, palmitoleic and petriselinic acids.

The term aliphatic refers to an alkyl, alkenyl, or alkynyl group, typically of $C_2$ to $C_{22}$.

Polymeric compositions that are permanently soil resistant are prepared that have fluorochemical dispersed throughout the polymer. Carpet and textile fibers prepared in this way have reduced surface energy and low static properties relative to the fiber without the fluorochemical. The fibers represent a significant advance in fiber and textile technology, in that the fluorochemical is dispersed throughout the polymer instead of coated onto the fiber, and is not removed from the fiber on washing.

The dispersion of the fluorochemical in the polymer improves characteristics of the polymer other than soil resistance. For example, polypropylene fibers that are extruded without a fluorochemical are highly static. Antistatic agents must be applied to the fiber after extrusion to keep the fiber from breaking or static clinging during later processing steps. However, the antistatic agents must be removed from the fiber by scouring after the fiber is tufted because they can increase the tendency of the fiber to soil on use. This process is cumbersome and increases the cost of the fiber. Polymers, and in particular polypropylene fibers, extruded with a fluorochemical do not require antistatic agents to facilitate handling, because they have inherently low static energy.

Fluorochemicals also impart antiwetting characteristics to polymers that are useful for a number of applications. For example, the fluorochemical can be extruded with a polymer into a thin film that repels water. This is particularly useful for certain manufacturing procedures that require a dry film for the application, for example, addition of an adhesive to a recently extruded film. Dispersion of the fluorochemical into the polymer also decreases the flammability and alters the combustion characteristics of the polymer.

I. Polymers Suitable for the Preparation of Soil and Stain Resistant Compositions The term "copolymer" as used herein includes polymers formed by the polymerization of at least two different monomers; a monomer and a polymer; or two or more polymers or oligomers. For simplicity, the term polymer as used herein includes copolymers and mixtures of polymers.

Any polymer, copolymer, or mixture of polymers is suitable for use in the soil resistant fiber that can be melt extruded and that is compatible with the desired fluorochemical. Common polymers that are typically melt extruded include nylon 6, polyester, polypropylene, and polyethylene.

A polymer should be selected that, when combined with the fluorochemical, has an appropriate viscosity and shear rate on extrusion. It should solidify within a reasonable time to a filament with appropriate characteristics for the desired function, including tensile strength (strain), elongation (stress), modulus, crystallinity, glass transition temperature, and melt temperature. These characteristics can be measured by known methods.

PCT/US92/05906 discloses a method for the preparation of polyurethane compositions with low surface energy that includes polymerizing a mixture comprising polyisocyanate, polyol, and a non-reactive fluoroaliphatic moiety of the types disclosed herein. The polyurethane is not prepared by simple extrusion of the fluorochemical with a preformed polyurethane, but instead by reactive extrusion, in which the monomers are actually polymerized in the presence of the fluorochemical. In contrast, in this invention, preformed polymers are simply melt extruded with the fluorochemical to form a soil resistant material.

II. Fluorochemicals

The term fluorochemical, as used herein, refers to an organic nonpolymeric compound in which more than two of the hydrogens atoms attached directly to carbon have been replaced with fluorine, or an organic polymeric compound in which at least one hydrogen attached to a carbon in a monomer used to prepare the polymer or copolymer is replaced with fluorine. Fluorochemicals are sometimes also called fluorocarbons or fluorocarbon polymers. Fluorochemicals can include other halogen atoms bound to carbon, notably chlorine.

The presence of the fluorine atoms impart stability, inertness, nonflammability, hydrophobic, and oleophobic characteristics to the molecule. Fluorochemicals are typically more dense and more volatile than the corresponding hydrocarbons and have lower refractive indices, lower dielectric constants, lower solubilities, and lower surface tensions than the corresponding nonfluorinated compound or polymer.

The fluorochemical selected for extrusion with the polymer can be perfluorinated, wherein all of the hydrogens are replaced with fluorine atoms, or semifluorinated, wherein two or more, but not all, of the hydrogens are replaced with fluorine. Suitable fluorochemicals for use in preparation of the soil resistant fibers are small molecules, oligomers, or polymers, or mixtures of these. The fluorochemical can be added to the mechanical blender in a solid or liquid form.

The fluorochemical or mixture of fluorochemicals that is selected should not include any moiety that reacts adversely or degrades on extrusion. Nonlimiting examples of functional or functionalized moieties that can be included in the fluorochemical include alcohols, glycols, ketones, aldehydes, ethers, esters, amides, acids, acrylates, urethanes, ureas, alkanes, alkenes, alkynes, aromatics, heteroaromatics, and nitriles. The functionalized moieties in the fluorochemical must be compatible with, and not adversely react with, functional or functionalized moieties in the polymer fiber, and must not decompose into undesired products during extrusion.

The fluorochemical extruded with the polymer can be homogeneous or can include a mixture of semifluorinated compounds, perfluorinated compounds, or both semifluorinated and perfluorinated compounds.

A wide range of fluorocarbon hydrocarbon polymers are known, including polytetrafluoroethylene, polymers of chlorotrifluoroethylene, fluorinated ethylene-propylene polymers, polyvinylidene fluoride, and poly(hexafluoropropylene). A variety of fluorochemicals are available Commercially, many from E. I. Du Pont Nemours and Company, Wilmington, Del. Other fluorochemicals that can be used include those that are now used commercially in fluorochemicals coatings, including Scotchgard™ 358 and 352 (Minnesota Mining & Mfg. Co.), Zonyl™ 5180 Fluorochemical dispersion, and Teflon™ Toughcoat Anionic (E. I. Du Pont de Nemours and Company, Inc.). Zonyl™ 5180 is an aqueous fluorochemical dispersion containing a 1–10% polyfunctional perfluoroalkyl ester mixture, 10–20% polymethylmethacrylate, and 70–75% water. Teflon™ Toughcoat Anionic contains 5–10% perfluoroalkyl substituted urethanes, 1–5% polyfunctional perfluoroalkyl esters, and 85–90% water.

If the fluorochemical is obtained as a water based emulsion, the emulsifiers and water should be removed before the fluorochemical is added to the blender with the polymer.

In a preferred embodiment, a fluorochemical is used that has a fluorinated alkyl group attached to a nonfluorinated oleophilic, alkyl, aryl, alkaryl or aralkyl group through a linking moiety. The fluorinated alkyl group tends to migrate through the fiber to the surface because it is both oleophobic and hydrophobic. The nonfluorinated oleophilic group remains anchored in the fiber. A fluorochemical containing a combination of a fluorinated alkyl group attached to a nonfluorinated organic group, thus, provides surface soil resistance and yet is held in the fiber. The linking moiety can be any chemical group that does not significantly adversely affect the desired performance of the fluorochemical, nor chemically react with the fiber.

Nonlimiting examples of fluoroaliphatic group-containing compounds useful for the preparation of soil resistant fibers are illustrated in Formula I.

$$[(R_f)_y(Q)_z]_x R \qquad \text{I}$$

In Formula I, $R_f$ is a fluorinated aliphatic moiety and y is 1 or 2. $R_f$ is preferably saturated, mono-valent and has at least 4 fully-fluorinated carbon atoms. It can be straight, branched, or, if sufficiently large, cyclic, or, alternatively, can contain a combination of straight, branched, or cyclic groups, for example a alkylcycloaliphatic radical. The skeletal chain in the fluoroaliphatic group can include hetero atoms (i.e., atoms other than carbon) bonded only to carbon atoms or the skeletal chain. Hydrogen or chlorine atoms can also be present as substituents in the $R_f$ moiety. While $R_f$ can contain a large number of carbon atoms, compounds with $R_f$ moieties of up to 20 carbon atoms are typically adequate, such as $CF_3(CF_2)_m$—, wherein m=3–20. The terminal portion of the $R_f$ group preferably has at least four fully fluorinated carbon atoms, e.g., $CF_3CF_2CF_2CF_2$—, and the preferred compounds are those in which the $R_f$ group is fully or substantially fluorinated, as in the case where $R_f$ is perfluoroalkyl, e.g., $CF_3(CF_2)_n$—, or $CF_3(CF_2)_nCH_2CH_2$—, wherein n is 1–19. Suitable $R_f$ groups include for example, $C_8F_{17}$—, $C_6F_{13}CH_2CH_2$—, $F_5SC_3F_6$—, $C_{10}F_{21}CH_2CH_2$—, $CF_3CF_2CF_2CF_2$—, and $HCF_2CF_2CF_2CF_2$—.

In Formula I, R is an oleophilic organic group which can contain from 2 to 35 carbon atoms, and more often, from 6 to 25 carbon atoms. R is selected such that it is soluble in or miscible with the fiber of interest. Examples of oleophilic organic groups are straight, branched, or cyclic alkyl, aryl, alkaryl, or aralkyl groups. Contemplated equivalents are any groups that perform substantially the function of imparting oleophilicity to the fluorochemical. R can also be a polyoxyalkylene group. Suitable R groups include, for example, —$C_{18}H_{37}$, —$C_{16}H_{33}$, —$C_{14}H_{29}$, —$C_6H_5$, —$C_6H_4CH_3$, —$C_6H_4CH_2CH_3$, —$C_6H_3(CH_3)_2$, —$C_6H_2(CH_3)_3$, —$C_{10}H_9$ (naphthyl), —[CH(CH_3)CH_2]_nH, —[CH(CH_3)CH_2]_n—, —[CH_2CH(CH_3)]_nH, —[CH_2CH(CH_3)]_n—, —[CH(C_2H_5CH_2]_nH, —[CH(C_2H_5)CH_2]_n—, —C_{18}H_{36}—, —C_{16}H_{32}—, —C_{14}H_{28}—, —C_6H_4—, —C_6H_4CH_2—, —C_6H_4CH_2CH_2—, and —C_6H_2(CH_3)_2—.

In Formula I, Q is the linking group and z is 0 or 1. When z is 0, Q is absent and $R_f$ and R are joined by a covalent bond. The linking group, Q, can be a heteroatom such as oxygen, sulfur, or N(alkyl)-, or can comprise a hetero atom-containing group, e.g., a group containing —S—, —O—, and or —N(alkyl)-, or a combination of such groups, for example —CO—, —C(O)O—, —CON(alkyl)-, —SO_2—, —SO_2N(CH_3)—, —C_3H_5Cl—; or —OC_2H_4—. —CH_2CH_2—O—C(O)—, —CH_2CH_2CH_2NHC(O)O—, —CH_2CH_2OC(O)NH—, and —CH_2CH_2CH_2NHC(O)NH—, wherein $R_f$ is on one side of Q and R is on the other side of Q. X is 1 or 2.

Examples of fluorochemicals include those wherein $R_fCH_2CH_2OH$ (or a mixture of fluorinated alcohols), or the corresponding amine (or mixture of amines) is reacted with a mono or poly functional reactive intermediate to provide corresponding fluorinated esters and urethanes, as illustrated below. For example a fluorinated alkyl ethyl alcohol, for example, $C_nFe_{(2n+1)}CH_2CH_2OH$, wherein n is 4–20 can be reacted with a di or polycarboxylic acid, including but not limited to sebacic acid, phthalic acid. terephthalic acid, isophthalic acid, adipic-acid. 1,10-dodecanoic acid, bis(p-carboxyphenoxyalkane), fumaric acid, 1,4-diphenylenediacrylic acid, branched monomers such as 1,3,5-benzenetricarboxylic acid, azeleic acid, pimelic acid, suberic acid (octanedioic acid), itaconic acid, biphenyl-4,4'-dicarboxylic acid, benzophenone-4,4'-dicarboxylic acid, p-carboxyphenoxyalkanoic acid, hydroquinone-O,O-diacetic acid, 1,4-bis-carboxymethyl benzene, 2,2-bis-(4-hydroxyphenyl)propane-O,O-diacetic acid, 1,4-phenylene-dipropionic acid, and cyclohexane dicarboxylic acid. Citric acid can also be reacted with the fluorinated alcohol or amine to provide a useful fluorochemical.

Examples of suitable monoisocyanates that can be reacted with fluorinated alcohols or amines as described above include a,a-dimethyl meta-isopropenyl benzyl isocyanate (TMI, available from American Cyanamid Company), phenyl isocyanate, cyclohexyl isocyanate, octyl isocyanate, hexyl isocyanate, 2-ethylhexyl isocyanate, 2,3,4-trimethylcyclohexyl isocyanate, 3,3,5-trimethyl isocyanate, decyl isocyanate, 2-norbornyl-methyl isocyanate, dodecyl isocyanate, tetradecyl isocyanate, hexadecyl isocyanate, octadecyl isocyanate (stearic isocyanate), oleic isocyanate, 3-butoxypropyl isocyanate, toluyl isocyanate, chlorophenyl isocyanate, dichlorophenyl isocyanate, benzyl isocyanate, and 1-naphthyl isocyanate.

The monoisocyanates can be purchased commercially or can be synthesized by methods known to those skilled in the art, for example, by the reaction of phosgene with the desired amine.

Examples of suitable diisocyanates that can be reacted with fluorinated alcohols or amines as described above include 4,4'-diphenylmethane diisocyanate (MDI, available from ICI Polyurethanes Group, West Deptford, N.J.); PBA 2259 (a more stable water dispersible version of MDI also available from ICI Polyurethanes Group); 3-isocyanatomethyl- 3,5,5-trimethylcyclohexyl isocyanate (IPDI, or isophorone diisocyanate, available from Huls America, Inc.); toluene diisocyanate (TDI); hexamethylene diisocyanate, octamethylene diisocyahate, decamethylene diisocyanate, cyclohexyl diisocyanate, methylenebis-(4-cyclohexylisocyanate), phenylene diisocyanate, diphenylether-4,4'-diisocyanate, xylene diisocyanate, tetramethyl xylene diisocyanate, polyether diisocyanate, polyester diisocyanate, polyamide diisocyanate, and dimer acid diisocyanate (a diisocyanate prepared from the reaction product of two unsaturated carboxylic acids).

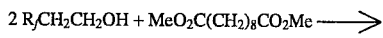

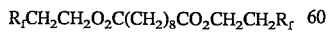

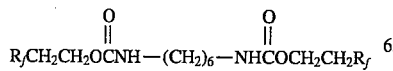

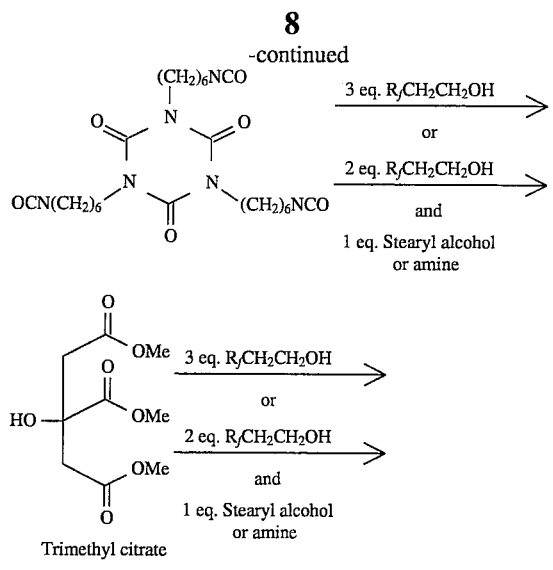

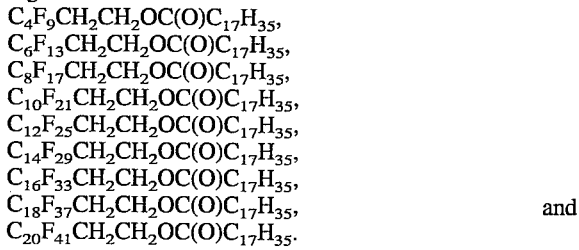

Trimethyl citrate

In a preferred embodiment, the fluorochemical is a perfluorinated alkyl ester of a long chain alkanoic or alkenoic acid. An example is that wherein $R_f$ is of the formula $CF_3(CF_2)_n$—, or $CF_3(CF_2)_nCH_2CH_2$—, wherein n is 1–19, and more typically 1–8, Q is —C(O)O—, y is 1, x is 1, and R is —$(CH_2)_mCH_3$, wherein m is 10 to 22. In one embodiment, $R_f$ is $CF_3CF_2(CF_2CF_2)_nCH_2CH_2$—, wherein n=1–9. Examples of —OC(O)R include, but are not limited to those formed from stearic, palmitic, lauric, oleic, caproic, linoleic, linolenic, caprylic, capric, perlargonic, neononanoic, neodecanoic, palmitelaidoic, myristic, arachidic, behenic, lignoceric, heptanoic, nonanoic, undecanoic, tridecanoic, pentadecanoic, heptadecanoic, nonadecanoic, heneicosanoic, tricosanoic, arachidonic, docosahexanoic, elaidic, erucic, nervonic, palmitoleic and petriselinic acids.

Examples of fluorochemicals that have a fluoroalkyl group attached to a nonfluorinated alkyl group through a linking moiety include, but are not limited to those described by Chemical Abstracts Registry number 65530-65-6, including $C_4F_9CH_2CH_2OC(O)C_{17}H_{35}$,
$C_6F_{13}CH_2CH_2OC(O)C_{17}H_{35}$,
$C_8F_{17}CH_2CH_2OC(O)C_{17}H_{35}$,
$C_{10}F_{21}CH_2CH_2OC(O)C_{17}H_{35}$,
$C_{12}F_{25}CH_2CH_2OC(O)C_{17}H_{35}$,
$C_{14}F_{29}CH_2CH_2OC(O)C_{17}H_{35}$,
$C_{16}F_{33}CH_2CH_2OC(O)C_{17}H_{35}$,
$C_{18}F_{37}CH_2CH_2OC(O)C_{17}H_{35}$, and
$C_{20}F_{41}CH_2CH_2OC(O)C_{17}H_{35}$.

The fluorochemical can be mixed with the polymer in combination with other components such as methyl stearate, methyl palmitate, methyl oleate and $C_nF_{(2n+1)}CH_2CH_2OH$, wherein n is 4–20. A preferred. fluorochemical marketed by Du Pont is Zonyl FTS Fluorotelomer 5823APP, that includes 85–90% perfluoroalkylstearate ((α-fluoro-ω-[2-[(1-oxooctadecyl)oxy]ethyl]-poly(difluoromethylene); CAS 65530-65-6), 1–5% fluorinated alcohol mixture (CAS 112-61-8), and 5–10% methyl stearate. Zonyl FTS is a waxy, light brown solid with a melting point between 30° and 45° C.

III. Extrusion of the Desired Polymer with the Fluorochemical

Extrusion is a process for making continuous-filament synthetic polymeric forms by forcing a polymer through minute holes of a spinneret with a rotating screw. The polymeric composition can be extruded in a thick form and cut into chips or flakes, or extruded in a thin form for use as carpet or textile fiber. Fiber extrusion is often referred to as "spinning" in the industry.

In a preferred embodiment, the fiber is prepared in a melt spin process, wherein the fiber-forming substance is melted and then extruded through the spinneret into a gas (such as air), or a liquid, to cool and solidify the fiber. Polypropylene, polyethylene, polyamide (nylon), and polyester (for example, Dacron, Terylene, and Vycron) fibers are prepared in this way. In this process, the fluorochemical can be extruded neat with the melted polymer. It is important in using this process to choose a polymer that has a melting temperature below that at which the fluorochemical that is extruded with it degrades or reacts. Polypropylene used for continuous filament fiber typically melts at approximately 300° F. Nylon is typically extruded at a temperature of approximately 490° F. The melt or degradation temperature of the fluorochemical to be used can be determined easily by known methods.

In one embodiment, in a first step of manufacture using melt extrusion, chips or flakes of a desired polymer and fluorochemical are initially prepared by known methods, typically in a dual screw (such as a Farrell) or single screw (such as a Mackie, Barmag, Filtecho, Plantex, Hills Reacher, or Neumag) device. The chips can be used as an additive in a manufacture of wide variety of polymeric articles, including thin film, and thermoplastic or thermoset objects. Alternatively, the chips can be extruded into fiber. The polymer/fluorochemical chip should be prepared in appropriate size to be used in the desired extrusion, molding, or other equipment.

In a second optional step, the polymer fluorochemical chips are used in a polymer extrusion feedstock along with chips or flakes of the same or a different polymer to produce a soil resistant fiber. For example, chips can be prepared from nylon and a fluorochemical, and then extruded in combination with polypropylene chips.

Soil resistant fibers can also be prepared by thin core coextrusion, that involves the extrusion of an inner core of a polymer with an outer core of a polymer that has fluorochemical embedded in it. Machinery appropriate for thin-core coextrusion is available from Hills Research corporation in Florida. For durability, an inner polymer core should be chosen that adheres sufficiently to the outer soil resistant polymeric composition. Thin core coextrusion can be used to prepare a wide variety of fibers for varying applications at varying costs. For example, a less expensive polymer can be used as an inner core of the fiber, and the desired polymer with fluorochemical soil protection as the outer core. Alternatively, a soil resistant fiber can be strengthened with a strong inner polymer core. Nonlimiting examples include fibers prepared by coextruding a polypropylene inner core with a polyamide/fluorochemical outer core, a polyamide inner core with a polypropylene/fluorochemical outer core, a polyethylene inner core with a polypropylene/fluorochemical outer core, a polypropylene inner core with a polyethylene/fluorochemical outer core, a polyethylene inner core with a polyamide/fluorochemical outer core, a polyamide inner core with a polyethylene/fluorochemical outer core, a polyester inner core with a polyamide/fluorochemical outer core, a polyamide inner core with a polyester/fluorochemical outer core, a polyethylene inner core and a polyester/fluorochemical outer core, a polypropylene inner core and a polyester/fluorochemical outer core, a polyester inner core and a polyethylene/fluorochemical outer core, a polyester inner core and a polypropylene/fluorochemical outer core, and variations of these.

The ratio of polymer to fluorochemical in the chip will vary based on the end use of the chip. In general, if the chip is to be extruded into fiber or made into an article without addition of other polymer chip in the final feedstock, less fluorochemical will be used than if the fluorochemical chip is later diluted with other polymer in the fiber or article formation. A ratio of fluorochemical to polymer should be used that produces a chip with the desired characteristics of melting temperature, strength, processability, soil resistance and antistatic properties. These characteristics can be measured easily by one skilled in the art of polymer technology. In a preferred embodiment, the ratio of polymer to fluorochemical in the chip ranges from 1:1 to 1000:1, and more preferably from 20:1 to 1:1, for melt extrusion. As an example of one embodiment of this invention, a feeder chip is prepared with approximately 1 part by weight of fluorochemical to 9 parts by weight of polymer. The 9:1 polymer/fluorochemical chip is then coextruded with polymer chip in a 1:1 weight:weight ratio to form a final product with the desired characteristics.

The temperature of extrusion will vary depending on the polymer and fluorochemical used in the process. Typical extrusion temperatures vary from 100° F. to 800° F., however, extrusion temperatures outside this range may be required in certain processes. The fiber denier will also vary depending on the product being prepared, and are typically within the range of 1 to 50,000. Carpet fibers typically range from 900 denier to 8000 denier.

A wide variety of textile treatment chemicals can be added to the extrusion process to improve the properties of the product. Examples include antioxidants, flame retardants, ultra-violet absorbers, dyes or coloring agents, and microbiocidal agents, including antibacterial agents, antifungals, and antialgals. Any commercially available textile treatment chemical that does not degrade or adversely react in the extrusion process is appropriate. Commercially available flame retardants include alumina trihydrate, calcium carbonate, magnesium carbonate, barium carbonate, metal oxides, borates, sulfonates, and phosphates.

EXAMPLE 1

Preparation of Polypropylene Zonyl FTS Chip

12 Melt flow polypropylene (FINA 3661) provided by Fina Oil and Chemical Corporation, Dear Park, Tex., was mechanically blended with Zonyl FTS Telomer Stearate 2967 (E. I. Du Pont Nemours and Company) in a weight ratio of 9 parts by weight of polypropylene to 1 part by weight of Zonyl FTS. The blended material was poured into a feed hopper, and forced through a single screw extrusion apparatus with temperature chambers of 490° F., 505° F., 510° F., 520° F., and 500° F. The extruded monofilament was cooled in a cold water quenching bath, and then passed through a chipper to provide soil resistant polypropylene chips. These chips can be used as a polymer additive or remelted and extruded into fiber.

EXAMPLE 2

Preparation of Nylon Zonyl FTS Chip

The procedure of Example 1 is repeated using nylon 6 in place of polypropylene.

EXAMPLE 3

Preparation of Polypropylene Zonyl FTS Fiber

Polypropylene Zonyl FTS chips prepared as in Example 1 are fed into a single screw extrusion apparatus, passed through a cooling chamber and around heated rollers. The fiber is then passed through forced air and wound onto a cone.

EXAMPLE 4

Preparation of Nylon Polypropylene Zonyl FTS Fiber

The procedure of Example 3 is followed with the exception that nylon chips and polypropylene Zonyl FTS chips are used as the feed stock in a 1:1 by weight ratio.

EXAMPLE 5

Preparation of Fiber by Coextrusion of Nylon/Zonyl FTS with Chips of Polypropylene Polypropylene chips are fed into a single screw extrusion apparatus manufactured by Hills Research Corporation, and then passed through a solution chamber that includes nylon 6 and Zonyl FTS. The coated fiber is then quenched in a cooling chamber and pulled around heated rollers. The fiber is then passed through forced air and wound onto a cone.

EXAMPLE 6

Preparation of Soil Resistant Polypropylene

Methyl stearate and methyl palmitate (65:35 by weight, respectively) were transesterified with Zonyl BA Flourotelomer Intermediate (Material Identification Corporate No. DU002423, which includes 93–98% poly(difluoromethylene),α-fluoro-ω-(2-hydroxyethyl) and 1–4% poly(difluoromethylene),α-fluoro-ω-(2-iodoethyl). The product was mixed with polypropylene in a 10:90 ratio by weight.

This invention has been described with reference to its preferred embodiments. Variations and modifications of the process for the preparation of soil resistant materials will be obvious to those skilled in the art from the foregoing detailed description of the invention. It is intended that all of these variations and modifications be included within the scope of the appended claims.

We claim:

1. A polymeric shaped article that comprises a material having a polymeric inner core and a polymeric outer core wherein:
   (a) the polymeric inner core comprises a polymer selected from the group consisting of polypropylene, polyethylene, polyamide and polyester; and
   (b) the polymeric outer core comprises a material prepared by:
      (i) mixing a polymer selected from the group consisting of polypropylene, polyethylene, polyamide, and polyester with a fluorochemical of formula $$R_f-Q-R$$

wherein:
   $R_f$ is selected from $CF_3(CF_2)_n-$ or $CF_3(CF_2)_nCH_2CH_2-$, wherein n is 1 to 19;
   Q is $-C(O)O-$ or $-OC(O)-$; and
   R is selected from $-(CH_2)_mCH_3$, wherein m is 13 to 22, and
      (ii) melt extruding the mixture.

2. The polymeric shaped article of claim 1 wherein the polymer and fluorochemical in the material of the polymeric outer core are present in a ratio that ranges from 1:1 to 1,000:1.

3. The polymeric shaped article of claim 1 wherein the polymer and fluorochemical in the material of the polymeric outer core are present in a ratio that ranges from 20:1 to 1:1.

4. The polymeric shaped article of claim 1 that includes a compound selected from the group consisting of an antioxidant, an ultraviolet light absorbing agent, a flame retardant, a dye or coloring agent, an antibacterial agent, an antifungal agent, and an antialgal agent.

5. The polymeric shaped article of claim 1, wherein the polymeric composition is prepared by thin core extrusion.

6. The polymeric shaped article of claim 1, wherein n is 1 to 9.

7. The polymeric shaped article of claim 1, wherein the fluorochemical is selected from the group consisting of:
$C_4F_9CH_2CH_2OC(O)C_{17}H_{35}$,
$C_6F_{13}CH_2CH_2OC(O)C_{17}H_{35}$,
$C_8F_{17}CH_2CH_2OC(O)C_{17}H_{35}$,
$C_{10}F_{21}CH_2CH_2OC(O)C_{17}H_{35}$,
$C_{12}F_{25}CH_2CH_2OC(O)C_{17}H_{35}$,
$C_{14}F_{29}CH_2CH_2OC(O)C_{17}H_{35}$,
$C_{16}F_{33}CH_2CH_2OC(O)C_{17}H_{35}$,
$C_{18}F_{37}CH_2CH_2OC(O)C_{17}H_{35}$, and
$C_{20}F_{41}CH_2CH_2OC(O)C_{17}H_{35}$.

8. The polymeric shaped article of claim 1, wherein R is $-C_{17}H_{35}$.

9. A method for preparing a polymeric shaped article comprising a polymeric inner core and a polymeric outer core via thin core extrusion wherein:
   (a) the polymeric inner core comprises a polymer selected from the group consisting of polypropylene, polyethylene, polyamide and polyester; and
   (b) the polymeric outer core comprises a material prepared by:
      (i) mixing a material selected from the group consisting of polypropylene, polyethylene, polyamide, and polyester with a fluorochemical of formula:

$$R_f-Q-R$$

wherein:
   $R_f$ is selected from $CF_3(CF_2)_n-$ or $CF_3(CF_2)_nCH_2CH_2-$, wherein n is 1 to 19;
   Q is $-C(O)O-$ or $-OC(O)-$; and
   R is selected from $-(CH_2)_mCH_3$, wherein m is 13 to 22, and
      (ii) melt extruding the mixture.

10. The method of claim 9, wherein n is 1 to 9.

11. The method of claim 9, wherein the fluorochemical is selected from the group consisting of:
$C_4F_9CH_2CH_2OC(O)C_{17}H_{35}$,
$C_6F_{13}CH_2CH_2OC(O)C_{17}H_{35}$,
$C_8F_{17}CH_2CH_2OC(O)C_{17}H_{35}$,
$C_{10}F_{21}CH_2CH_2OC(O)C_{17}H_{35}$,
$C_{12}F_{25}CH_2CH_2OC(O)C_{17}H_{35}$,
$C_{14}F_{29}CH_2CH_2OC(O)C_{17}H_{35}$,
$C_{16}F_{33}CH_2CH_2OC(O)C_{17}H_{35}$,
$C_{18}F_{37}CH_2CH_2OC(O)C_{17}H_{35}$, and
$C_{20}F_{41}CH_2CH_2OC(O)C_{17}H_{35}$.

12. The method of claim 9, wherein R is $-C_{17}H_{35}$.

13. The method of claim 9, wherein the shaped article which is produced by thin core extrusion is selected from the group consisting of a polyproplyene inner core with a polyamide/fluorochemical outer core, a polyamide inner core with a polypropylene/fluorochemical outer core, a polyethylene inner core with a polypropylene/flurochemical outer core, a polyethylene inner core with a polyethylene/flurochemical outer core, a polyethylene inner core with a polyamide/flurochemical outer core, a polyamide inner core with a polyethylene/fluorochemical outer core, a polyester inner core with a polyamide/fluorochemical outer core, a polyamide inner core with a polyester/flurochemical outer core, a polyethylene inner core and a polyester/fluorochemical outer core, a polypropylene inner core and a polyester/flurochemical outer core, a polyester inner core and a polyethylene/flurochemical outer core, and a polyester inner core and a polypropylene/fluorochemical outer core.

14. A polymeric shaped article that comprises a material having a polymeric outer core and a polymeric inner core wherein:

(a) the polymeric inner core is a polymer selected from the group consisting of polypropylene, polyethylene, polyamide and polyester; and (b) the polymeric outer core comprises a material prepared by:

(i) mixing a polymer selected from the group consisting of polypropylene, polyethylene, polyamide, and polyester with a fluorochemical of formula:

$$R_f\text{—}Q\text{—}R$$

wherein:

$R_f$ is selected from $CF_3(CF_2)_n$— or $CF_3(CF_2)_n CH_2 CH_2$—, wherein n is 1 to 19;

Q is —C(O)O— or —OC(O)—; and

R is selected from the group consisting of —$C_{14}H_{29}$, —$C_{15}H_{31}$, —$C_{16}H_{33}$, —$C_{17}H_{35}$, —$C_{18}H_{37}$, —$C_{19}H_{39}$, —$C_{20}H_{41}$, —$C_{21}H_{43}$, —$C_{22}H_{45}$, —$C_{23}H_{44}$; and (ii) melt extruding the mixture.

15. A polymeric shaped article that comprises a material having a polymeric inner core and a polymeric outer core wherein:

(a) the polymeric outer core comprises a polymer selected from the group consisting of polypropylene, polyethylene, polyamide and polyester; and (b) the polymeric inner core comprises a material prepared by:

(i) mixing a polymer selected from the group consisting of polypropylene, polyethylene, polyamide, and polyester with a fluorochemical of formula:

$$R_f\text{—}Q\text{—}R$$

wherein:

$R_f$ is selected from $CF_3(CF_2)_n$— or $CF_3(CF_2)_n CH_2 CH_2$—, wherein n is 1 to 19;

Q is —C(O)O— or —OC(O)—; and

R is selected from —$(CH_2)_m CH_3$, wherein m is 13 to 22, and (ii) melt extruding the mixture.

* * * * *